Dec. 25, 1962     E. EBDON     3,070,334

FLYING CONTROL SYSTEM FOR AIRCRAFT

Filed June 1, 1961     3 Sheets-Sheet 1

Eric Ebdon
*Inventor*

By
Stevens Davis Miller Mosher
*Attorneys*

Dec. 25, 1962 E. EBDON 3,070,334
FLYING CONTROL SYSTEM FOR AIRCRAFT
Filed June 1, 1961 3 Sheets-Sheet 2

Eric Ebdon
Inventor
By
Stevens, Davis, Miller & Mosher
Attorneys

Dec. 25, 1962  E. EBDON  3,070,334
FLYING CONTROL SYSTEM FOR AIRCRAFT
Filed June 1, 1961  3 Sheets-Sheet 3

Eric Ebdon
Inventor

By
Stevens Davis Miller & Mosher
Attorneys

United States Patent Office 3,070,334
Patented Dec. 25, 1962

3,070,334
FLYING CONTROL SYSTEM FOR AIRCRAFT
Eric Ebdon, Caddington, near Luton, England, assignor to Power Jets (Research and Development) Limited, London, England, a British company
Filed June 1, 1961, Ser. No. 114,077
Claims priority, application Great Britain June 16, 1960
2 Claims. (Cl. 244—90)

The present invention relates to flying control systems for aircraft. It is considered to have particular though not necessarily exclusive application to aircraft operating on the "jet flap" principle.

It has already been proposed that the two spanwise-extending jet sheets discharged from opposite wings of a jet flap aircraft should be capable of being deflected either downwardly together in the manner of wing flaps or in opposite senses in the manner of ailerons. It has likewise been proposed that provision should be made for drooping conventional ailerons so that they will perform the functions of wing flaps. The present invention provides a mechanism whereby trailing edge lift control devices, which may be the jet deflectors of the jet flap aircraft or conventional flying control surfaces, can be operated to perform the dual function of ailerons and flaps.

The invention accordingly provides a flying control system for an aircraft having trailing edge lift control devices on its wings, the system comprising a pilot's control column connected to a lever pivotally mounted at mid length on a supporting member and connected at its opposite ends to the lift control devices on opposite wings so that turning of the lever about its pivotal axis by the pilots' control column operates the lift control devices in opposite senses, and a further independent control connected to move the supporting member and the lever bodily so as to operate the lift control devices on opposite wings in the same sense.

According to a feature of the invention the first mentioned lever is fast with a second lever linked to a third lever parallel thereto, the control column being connected to turn the third lever about an axis parallel to the pivotal axis of the first-mentioned lever, and the supporting member is pivotally mounted on said parallel axis.

One embodiment of the invention will now be described by way of example with reference to the accompanying diagrammatic drawings, of which:

Figure 1:
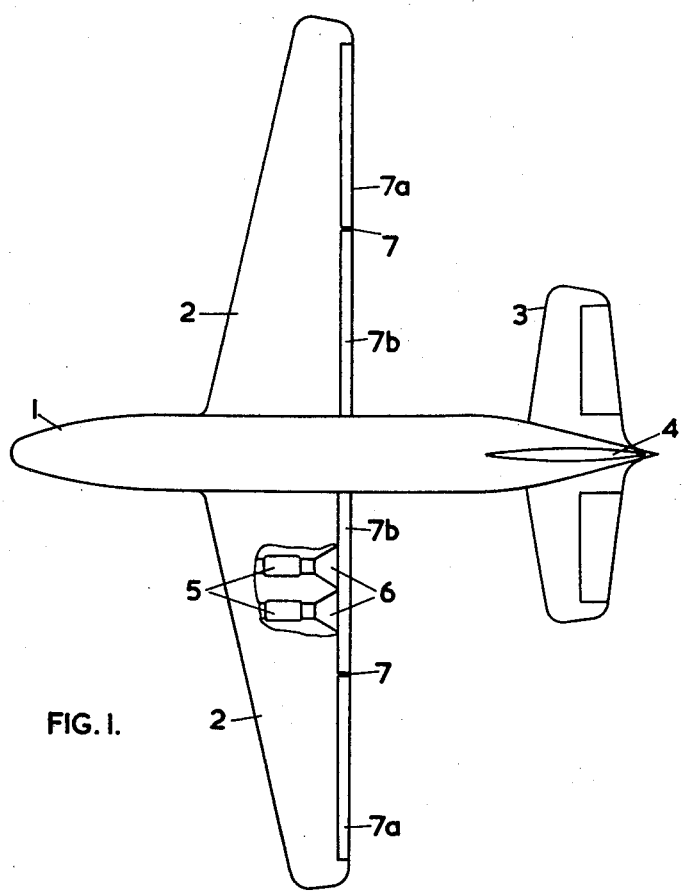
FIGURE 1 is a plan view of a jet flap aircraft, part of the upper surface of one wing being shown as broken away.
Figure 2:
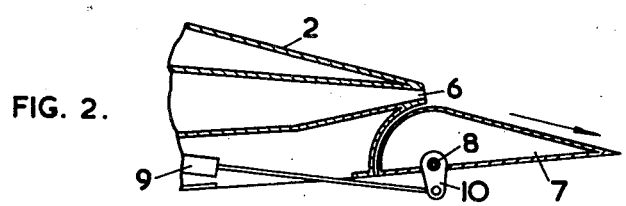
FIGURE 2 is a sectional view through the rear part of one wing of the aircraft.

The aircraft of FIGURE 1 comprises a fuselage 1, a pair of wings 2, a tailplane 3 and a fin and rudder 4. It is powered by a number of gas turbine jet propulsion engines 5 mounted within and distributed along the span of the wings, each engine being connected to discharge its jet stream through a long shallow nozzle 6. These nozzles are contiguous at their edges and together extend along practically the whole wing span so that the jet streams are discharged rearwardly as long thin jet sheets. The wings carry trailing edge lift control surfaces 7 of the form of wing flaps which similarly extend along practically the full span of the wing. As shown in FIGURE 2 the jet nozzles 6 are arranged to discharge the jet sheets over the upper surfaces of the flaps 7, and by turning the latter about their axes 8, the jet sheets may be deflected upwardly and downwardly from the rearward direction, turning being effected by means of jacks 9 connected to brackets 10 on the flaps.

As shown in FIGURE 1 the flaps 7 are divided in a spanwise sense into inboard and outboard sections. For the purposes of identification the outboard sections 7a will hereinafter be referred to as the ailerons and the inboard sections 7b, as the flaps though as will appear below, the ailerons also perform the functions of flaps.

Figure 3:
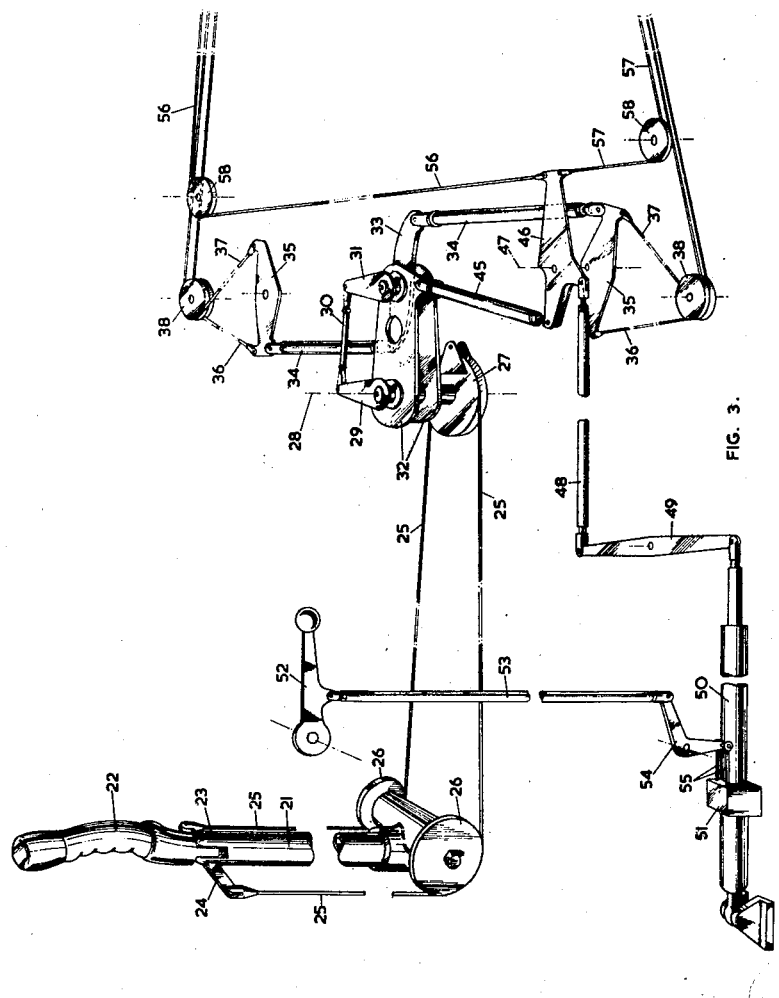
FIGURE 3 is a schematic view of the aircraft flying control system.
Figure 3:
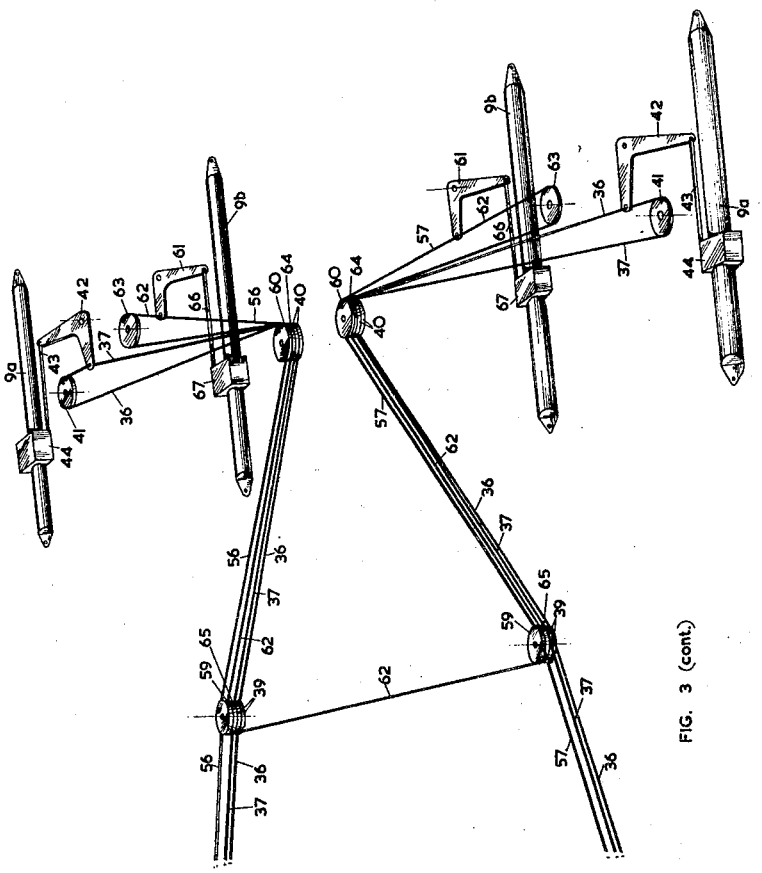

Referring now to FIGURE 3, the flying control system comprises a pilots' control column 21, the handle part 22 of which can be turned about a pivot 23. A yoke 24 is mounted for rotation with the handle and the ends of a cable 25 are connected to the ends of this yoke. The cable passes around a pair of pulleys 26 and is looped around and secured to a spool 27 pivotally mounted on a vertical axis 28.

The spool 27 is rigidly connected to a lever 29 and this lever is connected by a link 30 to a parallel lever 31. This latter lever is pivotally mounted on a supporting member consisting of a pair of plates 32 which are themselves pivotal about the vertical axis 28. The lever 31 is fast with a double-ended lever 33, carried at its mid point between the supporting plates 32, and the ends of the lever 33 are connected through links 34 to a pair of yokes 35 pivotally mounted at mid length for rotation about vertical axes. Cables 36, 37 are connected to the ends of the yokes 35 and these cables pass around pulleys 38, 39, 40, 41 and are connected at their ends to bell crank levers 42. The bell crank levers are in turn connected through links 43 to operate the servo control mechanisms 44 of the hydraulic jacks 9a for the ailerons 7a.

It will be seen that turning the handle 22 of the control column will act through cable 25 to cause rotation of the spool 27 and the levers 29, 31, 33. The yokes 35 are thereby turned in the same sense and the connections through the cables 36, 37 to the hydraulic jacks 9a are such that the ailerons 7a on opposite wings are turned in opposite senses. The outboard sections of the jet sheets discharged from the engines are thus deflected in opposite senses so as to produce the equivalent of conventional aileron control.

As mentioned above, the plates 32 are pivotal about axis 28 and hence the pivotal axis of levers 31 and 33 is bodily movable. The free ends of plates 32 are connected by a link 45 to one arm of a three-arm lever 46 which is pivotally mounted on a vertical axis 47. A second arm of lever 46 is connected through link 48 and lever 49 to a hydraulic jack 50. This jack has a servo-control mechanism 51 operable by a flap control lever 52 connected thereto through link 53, bell crank lever 54 and link 55. Movement of the flap control 52 actuates the jack 50 to turn lever 46, which acts through link 45 to turn the plates 32 about the axis 28. The lever 33 is thereby moved bodily and acts through links 34 to turn the yokes 35 in opposite senses, and the connection through the cables 36, 37 to the hydraulic jacks 9a is effective to turn the ailerons 7a in the same sense. The outboard sections of the jet sheets are thereby deflected downwardly together to perform the function of wing flaps, i.e., to increase lift on take-off and landing.

It will be seen that the handle 22 of the control column and the flap control lever 52 act on the ailerons independently of one another. Thus the ailerons can be turned in opposite senses by the handle even when they are set in a lowered position by the flap control lever.

The flap control is also effective to operate the inboard flaps 7b. The third arm of lever 46 has connected to it the ends of cables 56, 57. These cables pass around pulleys 58, 59, 60 and are connected at their ends to bell-crank levers 61. The cable ends of the two levers 61 are connected to one another by a return cable 62 passing around pulleys 63, 64, 65, while their other ends are connected through links 66 to the servo-control mechanisms 67 of the jacks 9b for the flaps 7b. Thus movement of the lever 46 effected by the flap control 52 is also effective to turn the flaps 7b and hence to deflect the inboard sections of the jet sheets together with the outboard sections.

The relative magnitudes of the various movements of the ailerons and flaps will depend on the dimensions of the various levers and links of the control system. It is contemplated that the ailerons should be capable of being turned by the control column handle through an angle of up to 20° on each side of the datum position, while they could be lowered through an angle of 40° from the datum position by means of the flap control. The length of the arms of the lever 46 may be such that the flaps and ailerons are turned through equal or different angles by the flap control 52.

The hydraulic jack 50 includes a spring box, movement of the flap control 52 actuating the jack to initially compress a spring which then operates on the control system to turn the ailerons and flaps. The flap control lever 52 can thus be moved to a desired "flaps down" position, and the movement of the flaps and aileron will follow at the desired rate. Provision may be made for selecting any one of a number of "flaps down" positions, e.g. one for take-off and a different one for landing.

In the embodiment described only the outboard sections of the trailing edge control surfaces are capable of being turned in opposite senses. However the invention is equally applicable to an aircraft in which the whole of the control surface constitutes an aileron; in this case the jacks 9b and the associated control cables 56, 57, 62 would be omitted.

While only a single hydraulic jack 9a, 9b has been shown for each aileron or flap, it will be understood that multiple jacks could be used depending on the size of the aircraft and the magnitude of the control forces involved.

The system could similarly be applied to aircraft other than jet flap aircraft in which conventional ailerons are also required to perform the functions of flaps.

What I claim is:

1. In an aircraft comprising a pair of opposite wings and trailing edge lift control devices on the wings, the lift control device on each wing being divided into an inboard and an outboard section, a flying control system comprising a pilot's control column; a movable supporting member; a lever pivotally mounted at mid length on the supporting member; means connecting the control column to turn the lever about its pivotal axis; means connecting opposite ends of the lever only to the outboard sections of the lift control devices on opposite wings so that turning of the lever by the control column operates the outboard sections of the lift control devices on opposite wings in opposite senses; a further control independent of the control column; means connecting the further control to move the supporting member and the lever bodily so as to operate the outboard sections of the lift control devices on opposite wings together in the same sense; and means connecting the further control to the inboard sections of the lift control devices to operate them together in the same sense as the outboard sections.

2. In an aircraft comprising a pair of opposite wings and trailing edge lift control devices on the wings, a flying control system comprising a pilot's control column; a supporting member mounted for pivotal movement about a fixed axis; a first lever pivotally mounted at mid length on the supporting member to turn about an axis parallel to said fixed axis; a second lever fast with the first lever and pivotally mounted to turn about said parallel axis; a third lever parallel to the second lever and pivotally mounted to turn about said fixed axis; a link connecting the second and third levers; means connecting the control column to the third lever to turn it about said fixed axis and hence to turn the second and third levers about said parallel axis; means connecting opposite ends of the first lever to the lift control devices on opposite wings so that turning of the first lever about said parallel axis by the control column operates the lift control devices on opposite wings in opposite senses; a further control independent of the control column; and means connecting the further control to the supporting member to turn it about said fixed axis and to move the first lever bodily so as to operate the lift control devices on opposite wings together in the same sense.

References Cited in the file of this patent

UNITED STATES PATENTS

| | | |
|---|---|---|
| 2,573,044 | Morris | Oct. 30, 1951 |
| 2,585,676 | Poisson-Quinton | Feb. 12, 1952 |
| 2,978,207 | Davidson | Apr. 4, 1961 |

FOREIGN PATENTS

| | | |
|---|---|---|
| 1,110,056 | France | Oct. 5, 1955 |